UNITED STATES PATENT OFFICE.

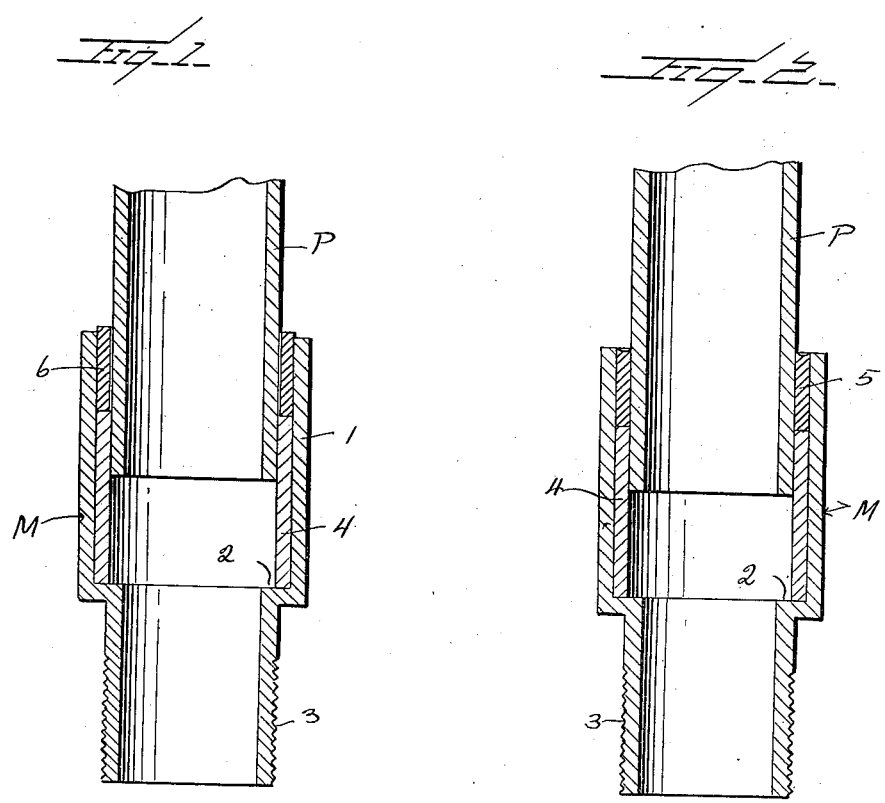

LEWIS M. TRAUTMAN AND ROBERT G. SMITH, OF COLORADO SPRINGS, COLORADO.

PIPE-FITTING.

1,369,991.          Specification of Letters Patent.          Patented Mar. 1, 1921.

Application filed September 24, 1919. Serial No. 326,001.

*To all whom it may concern:*

Be it known that we, LEWIS M. TRAUTMAN and ROBERT G. SMITH, citizens of the United States, residing at Colorado Springs, in the county of El Paso and State of Colorado, have invented certain new and useful Improvements in Pipe-Fittings, of which the following is a specification, reference being had to the accompanying drawings.

This invention relates to certain improvements in pipe fittings and has relation more particularly to a device of this general character adapted for connecting the waste and vent pipes of a lavatory, and it is an object of the invention to provide a novel and improved fitting of this general character whereby the same can be effectively and conveniently applied in working position within a comparatively short period of time and in locations wherein it is substantially impossible to make the conventional union connections.

Another object of the invention is to provide a novel and improved fitting of this general character wherein the mounting or application is substantially permanent, and wherein the resultant connection is tight.

The invention consists in the details of construction and in the combination and arrangement of the several parts of our improved pipe fittings whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:

Figure 1 is a sectional view illustrating a pipe fitting constructed in accordance with an embodiment of our invention, with the parts initially assembled, and, Fig 2 is a view similar to Fig. 1 with the fitting sealed.

As disclosed in the accompanying drawings our improved fitting comprises a tubular member M of requisite length and having an end portion 1 of the bore thereof enlarged, resulting in the internal annular shoulder 2. The opposite end portion of the tubular member M is threaded, as in 3, whereby the member or fitting may be operatively engaged with the pipe with which it coacts. While the threaded portion 3 is herein disclosed as external, it is to be understood that the same may be internal, but as this forms no particular part of our present invention, it is not believed that a detailed illustration thereof is necessary.

An end portion of a vent pipe P or the like is inserted within the large portion 1 of the fitting or member M before said fitting M is engaged or connected with its coacting pipe. The fitting or member M is applied to its work with the end portion of the pipe P inserted therein, and after the fitting or member M has been engaged with the work an annular member or ring 4 is inserted within the enlarged portion 1 of the bore of the member or fitting M, and which member or ring 4 when applied rests upon the internal annular shoulder 2. The annular member or ring 4 is of such length as to partially surround the inner end portion of the inserted pipe P.

After the member or ring 4 has been applied a lead ring 5 is dropped down within the enlarged portion 1 of the bore of the member or fitting M to engage the annular member or ring 4. The lead ring 5 is of a length to initially extend beyond the outer end of the portion 1, so that upon some pressure or blows being imposed upon said lead ring 5 the space between the fitting or member 1 and the inserted end of the pipe P outwardly of the ring 4 may be calked.

The annular member or ring 4 and the lead ring 5 may be applied over the upper or outer end of the pipe P, or if the condition of the work necessitates, the same may be suitably engaged with the pipe P before an end portion of said pipe is inserted within the enlarged portion 1 of the bore of the member or fitting M. As illustrated in the accompanying drawings, it will be particularly noted that the wall of the member or ring 4 is substantially the same thickness at all points and of a thickness to snugly fit between the periphery of the inserted end portion of the pipe P and the internal wall of the enlarged portion 1 of the member M. It will also be particularly noted that the periphery of the member 4 has close contact at all points with the internal wall of said portion 1.

From the foregoing description, it is thought to be obvious that a pipe fitting constructed in accordance with our invention is particularly well adapted for use by reason of the convenience and facility with which it may be assembled and operated and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

A fitting adapted to connect two pipes comprising a tubular member having inwardly thereof an annular shoulder, an end portion of said tubular member being adapted for engagement with a pipe, the opposite end portion of the tubular member being adapted to receive a second pipe, an annular member insertible within said second end portion of the tubular member for contact with the internal shoulder, the wall of said annular member being of substantially the same thickness at all points, the annular member having its periphery in close contact with the internal wall of the tubular member, said annular member being of a length to partially surround the inserted end portion of a pipe when said annular member is in contact with the internal shoulder, and an annular filler member of soft metal surrounding the inserted portion of a pipe and seating within the second end portion of the tubular member outwardly of the first named annular member and in contact therewith, said second named annular member being initially of a length to extend outwardly of the tubular member when in contact with the first named annular member.

In testimony whereof we hereunto affix our signatures.

LEWIS M. TRAUTMAN.
ROBERT G. SMITH.